United States Patent [19]

Chiantella et al.

[11] Patent Number: 4,459,078

[45] Date of Patent: Jul. 10, 1984

[54] CONVEYOR DEVICE FOR A STORAGE PLANT

[75] Inventors: Giovanni Chiantella, Pisa; Renato Lissoni, Leghorn, both of Italy; Christoph Gloor, Oberengstringen; Franco Biesuz, Unterenstringen, both of Switzerland

[73] Assignees: C.M.F. Costruzioni Metalliche Finsider S.p.A., Leghorn; FATA European Group S.p.A., Turin, both of Italy

[21] Appl. No.: 351,875

[22] Filed: Feb. 24, 1982

[30] Foreign Application Priority Data

Mar. 13, 1981 [IT] Italy ............................... 20348 A/81

[51] Int. Cl.³ .............................................. B65G 1/06
[52] U.S. Cl. .................................. 414/279; 414/284; 414/495; 414/498
[58] Field of Search ............... 414/253, 254, 264, 266, 414/267, 277, 279, 281, 282, 284, 495, 498

[56] References Cited
U.S. PATENT DOCUMENTS

| | | | |
|---|---|---|---|
| 2,915,204 | 12/1959 | Alimanestiano | 414/282 |
| 2,923,421 | 2/1960 | de Roumefort | 414/252 X |
| 3,411,642 | 11/1968 | Alimanestianu | 414/482 |
| 3,800,963 | 4/1974 | Holland | 414/279 |
| 3,866,767 | 2/1975 | Zollinger et al. | 414/279 |
| 3,973,685 | 8/1976 | Loomer | 414/273 |

Primary Examiner—Leslie J. Paperner
Attorney, Agent, or Firm—Oblon, Fisher, Spivak, McClelland & Maier

[57] ABSTRACT

Conveyor device for a storage plant, comprising a lower truck 23, which in order to receive and store load units is equipped with at least two translation platforms 27, 28 that are operable independently of one another.

The lower trucks 23, which are carried through the "hucke-pack" system by a respective bearing truck 24, are movable away from and to the bearing trucks 24 on sliding rails 25, 26 in the storage shelves 4 and positioned directly below the load units. A respective bearing truck 24 and lower truck 23 carried thereby form all together a horizontal conveyor unit which in any case with a load unit from the hoist or elevator 8 is transported between the floors 3 and transfer station 9 and is freely movable independently of the same in such floors 3.

By the embodiment according to the invention of the means for holding loads on the lower truck 23 with at least two translation platforms 27, 28 consistent with the load, more efficient storage strategies are provided for mixed storage of load units with at least two base surfaces of different size.

A conveyor device according to the invention provides storage plants which through direct access to every storage room have improved characteristic values as to transport capability and space exploitation.

1 Claim, 8 Drawing Figures

CONVEYOR DEVICE FOR A STORAGE PLANT

This invention relates to a conveyor device for a storage plant, comprising at least two floors, each of which having at least one longitudinal lane and storage shelves, which are situated at the two sides of the longitudinal lane, transversely of the latter, to hold load units that by means of a lower truck are displaceable in the storage partitions through a bearing truck designed to carry the lower truck, are movable in the longitudinal lanes, and are vertically movable by means of at least one hoist or elevator prearranged for holding bearing trucks with lower trucks.

For example, such conveyor devices are for intermediate storage of water-craft containers, which is carried out for transport by land and transport by sea.

In the French Pat. No. 2,197,788 the storehouse partitions, that are arranged in floors of a storing frame made of steel or reinforced concrete, are implemented in the form of a tunnel having special loading vehicles moving therein. For the introduction and removal of the storehouse product and change of location for the loading vehicles between tunnel and floors at least one horizontally movable vertical hoist or elevator is provided, the translation platform of which is implemented to hold the loading vehicles and can be moved on the tunnel end, vertically and transversely of the tunnel. In this storage device disadvantageous are the relatively low transport height and moderate bearing force, peculiar for horizontally movable vertical hoists or elevators.

As a result, the maximum constructive height of the storehouse is limited or restricted, so that the ground foundation, which in the limits of harbour plants is mostly very narrow and expensive, cannot be exploited to the desired degree. Furthermore, the load units, such as containers and the like, are often of such a weight that for horizontally movable vertical hoists or elevators is an inadmissable stress.

In the storage device disclosed in the published patent application of West Germany No. 2,406,378, a conveyor truck and a holding truck are movable independently of each other on rails in the lanes between the storehouse partitions, wherein the holding truck has a device by which individual articles can be transported from the storehouse partitions to the conveyor truck. This known type of storage device allows the order composition of articles within the storehouse, but requiring to this purpose a large heavy expense in equipment. This particularly occurs for the conveyor means used, which are optimized on the highly specialized function of the order composition. For a simple storing of load units, such as containers and the like, such order composition devices are a too large heavy expense and in no way correspond to the requirements for a rational storehouse operation. In addition, as to manufacture and maintainance, they are also expensive and have a very bad degree of space exploitation.

It is the object of the present invention to propose a simple and effective conveyor device of the kind referred to at the beginning of this specification, which is optimized on mixed storage of load units having at least two base surfaces of different size and which by high storehouse availability assures a direct access to every storage room.

It is also the object of the invention to provide a conveyor device, which can be integrated in the conventional course of container transfer on the harbour dock side, and particularly also has a good degree of space exploitation and is economically advantageous.

This problem is solved by the invention characterized in the appended claims. Owing to these expedients, not only is advantageously solved the task indicated as the basis of the invention, but a conveyor device is also provided, which is optimized on mixed storage of load units with base surfaces which are different from one another, and accordingly offers the following advantages.

Even if relating to actual load units, loads of similar configuration are dealt with, normally such units cannot be referred to as an assembly of identical storage products. Ship containers, to the intermediate harbour dock side storage of which the present invention is concerned with, are at present provided in the standard lengths of 20 feet and 40 feet. By dividing the translation platform consistently with the load, more efficient strategies result for storage, withdrawal and transfer of load units with base surfaces of different size, so that for preassigned operative criteria, an optimum storage operation is provided. Thus, for example, the power or capability of the conveyor means used is increased, and accordingly is improved the inexpensiveness of the storehouse as a whole.

Another advantageous effect of the invention is provided in that, as a result of the division of the translation platform consistently with the load and minimum expense, an inner transfer can be carried out also for short containers. These transfers can be at any time easily and rapidly carried out with the aid of two translation platforms, both operable independently of each other, so that in the form of integrant component they can be included in the normal unloading operation from the storehouse. This enables to align with one another determined storehouse rooms, for the best exploitation of the space as possible, without single access and provide the required direct access by inner passage to any room of the storehouse. It results therefrom a high exploitation of the storehouse base surface, which is mostly expensive in dock zones, where for requirements of practical storage operation the principle of direct access to every storage room is completely assured.

A further advantage may consist of that, owing to the moderate constructive height of the lower truck and translation platform, the passage is allowed to the storage rooms below those occupied. This also allows to individually displace the short containers in the depth of the storehouse rooms, and accordingly improve the storage performances. In addition, as a result of the moderate size of the lower truck, storage structures can be implemented with high degree of space exploitation.

The invention will be hereinafter described as applied to intermediate storage of ship containers between transport by land and transport by sea. However, the principle here considered as a basis, can be similarly adopted also for other load units, such as for example piece products on pallets.

Exemplary embodiments are illustrated to further detail with reference to the accompanying drawings, in which:

FIG. 1 is a perspective view showing a part of storage plant comprising storehouse frame and conveyor device;

FIG. 2 schematically shows a fragmentary perspective view of a bearing truck with lower truck inserted in a storehouse room;

Figure 1:
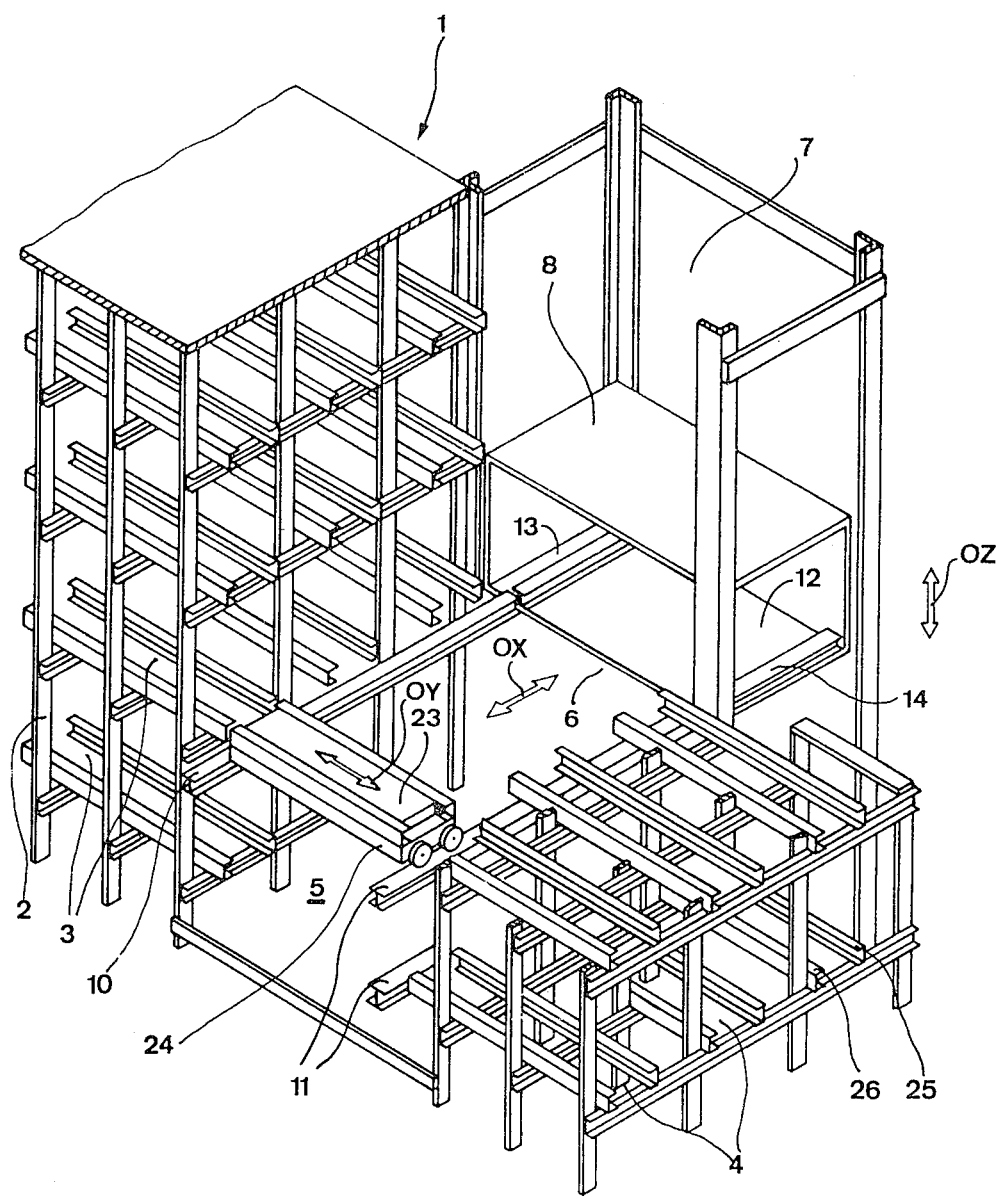
Figure 2:
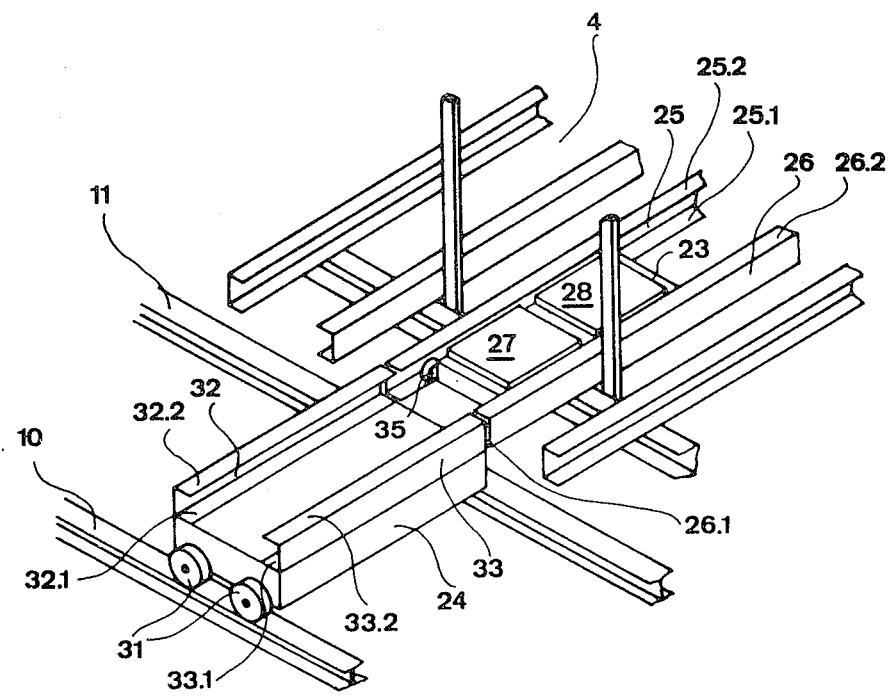
Figure 3:
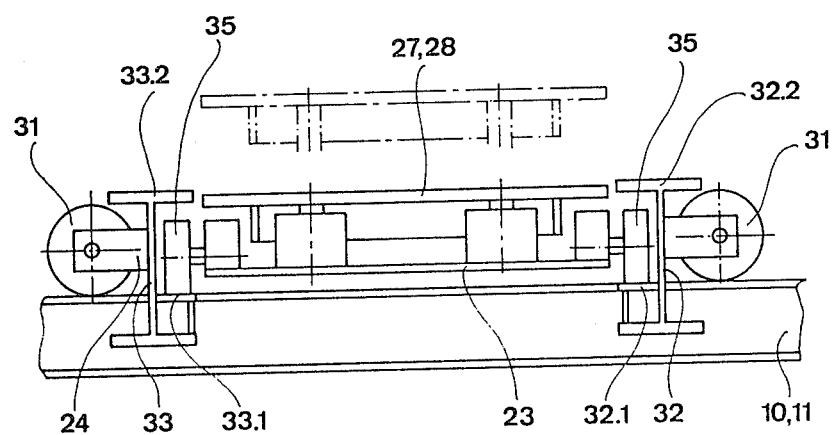
FIG. 3 is a constructive drawing of the horizontal transport unit, comprising a bearing truck and lower truck carried thereby.
Figure 4:
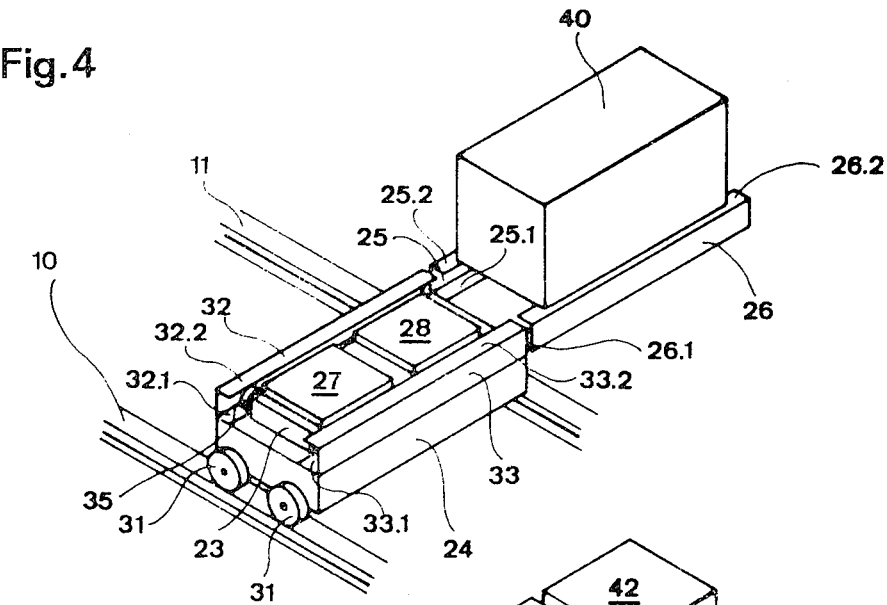
FIG. 4 is a perspective view schematically showing a storehouse room with a long container, as well as a horizontal transporting unit.

The embodiment according to FIGS. 1, 2 and 3 shows a storage plant as comprising a bearing steel structure 1 having a plurality of storage frames 2, which are divided into floors 3 and individual storehouse rooms 4. Each floor 3 has a longitudinal lane 5 extending throughout the length of the storage plant and from which storehouse rooms 4 branch off at right angles, that along said lane form each a row on both sides, and wherein the storehouse material is placed or stored. By the lane ends 6 thereof, said longitudinal lanes 5 open on one side to a hoist or elevator wellhole 7, so that in well known manner a vertical hoist or elevator 8 moves between said floors 3 and a transfer station (not shown). By a harbour portal or gantry crane (not shown) the incoming containers are prepared on the transfer station to be received by a horizontal transporting unit and at the same time are registered for storehouse administration.

The transport technique as a basis for the storage plant is grounded on the principle of dividing every movement in the storehouse in accordance with three spatial axes and allotting to the same the following specialized conveyor means, that is: a bearing truck 24 for the spatial axis OX along the longitudinal lanes 5, a lower truck "hucke-pack" 23 carried by the bearing truck 24 for the spatial axis OY in the individual storehouse rooms 4, as well as a vertical hoist or elevator 8 fixed on site for the spatial axis OZ between a transfer station and individual floors 3.

In FIG. 1, the arrows show the movements of the above mentioned conveyor means in said floors 3 and cage of elevator 7 and accordingly the path of the storehouse product in and out of the storehouse. In each floor 3 said longitudinal lane 5 is provided with two sliding rails 10, 11, on which the bearing truck 24 is longitudinally or horizontally movable. Also the platform 12 of the vertical hoist or elevator 8 is fitted with sliding rails 13, 14, which at the stop locations of the vertical hoist or elevator 8 with said rails 10, 11 are oriented in the corresponding longitudinal lanes 5, so that said bearing truck 24 can be displaced from any longitudinal lane 5 on the hoist or elevator platform 12 for transportation between the floors 3 and transfer station 9.

The lower truck "hucke-pack" carried by the bearing truck 24 is intended for automatic movement along the spatial axis OY in the storehouse rooms 4, where two C-shaped rails 25, 26 are placed, on the lower flange 25.1, 26.1 of which a lower truck 23 is movable in a direction away from the bearing truck 24 and to the latter in the storehouse room 4, and on the upper flanges 25.2, 26.2 of which the unitary loads 40, 41, 42, 43, 44 are placed.

In addition to acting as a bearing or support for the conveyor trucks, that is for the storehouse material, said sliding rails 10, 11, 25, 26 form a part of the supporting elements for the storage frame.

A guide mechanism having laterally applied rollers prevents any jamming during advancement or forward movement.

By providing a suitable positioning of the bearing truck 24 in the longitudinal lanes 5, the sliding rails 32, 33 thereof carrying the lower truck 23 can be aligned with the sliding rails 25, 26 in any storehouse room 4, whereupon the lower truck 23 is on its sliding rollers 35 movable from the bearing truck 24 in the storehouse rooms 4, to receive or lay down therein load units 40, 41, 42, 43, 44 to be transported respectively between the storehouse rooms.

To this end, the lower truck 23 is provided with a load holding means, which substantially comprises at least two translation platforms 27, 28, which as to the size thereof match with the corresponding base surfaces of the load units 40, 41, 42, 43, 44. In order to hold or deposit the storehouse material, such translation platforms 27 and 28 consistent with the loads provide for positioning directly below the load units 40, 41, 42, 43 and 44 to be lifted or lowered independently of each other.

A respective bearing truck 24 and lower truck 23 "hucke-pack" carried thereby are rigidly associated with each other and form a horizontal transporting unit, which along with a load, that in any case is on the translation platforms 27 and 28, can be transported by the vertical hoist or elevator 8 between the floors 3 and transfer station 9, and as a self-contained transporting means freely moves in the floors independently of the vertical hoists or elevators.

The conveyor means, comprising a horizontal transporting unit, and particularly the bearing truck 24 as well as the lower truck 23, have proper driving motors, acting upon the associated sliding rollers or wheels 31, 35, that is on the translation platforms 27, 28, so that they are automatically movable in the longitudinal lanes 5, respectively in the storehouse rooms 4.

The supply by electric energy is conventionally carried out, or by self-governing through batteries simultaneously transported on the conveyor truck, or by contact shoes, by sliding contact lines, or bus bars extending along the path of the conveyor means, or by drawing cables.

Hereinafter, the operative modality of the novel conveyor device is shown to further detail with reference to FIGS. 1, 2, 3, 4, 5, 6, 7 and 8. What is particularly desired to show is how the equipment or outfit according to the invention of said lower truck 23 with at least two translation platforms 27 and 28, which are independent of each other, makes possible novel types of storage strategies, improving the transport power or capability and accordingly reducing the cost of the storehouse as a whole. This is provided in that by the novel storage strategies such idle strokes and transfer strokes of the vertical hoists or elevators as those hitherto required for mixed storing of short and long containers are avoided. This optimum exploitation of vertical transports increases the transport power or capability, since in storage plants of this design the total transport power or capability is usually limited by the vertical transports.

Figure 5:
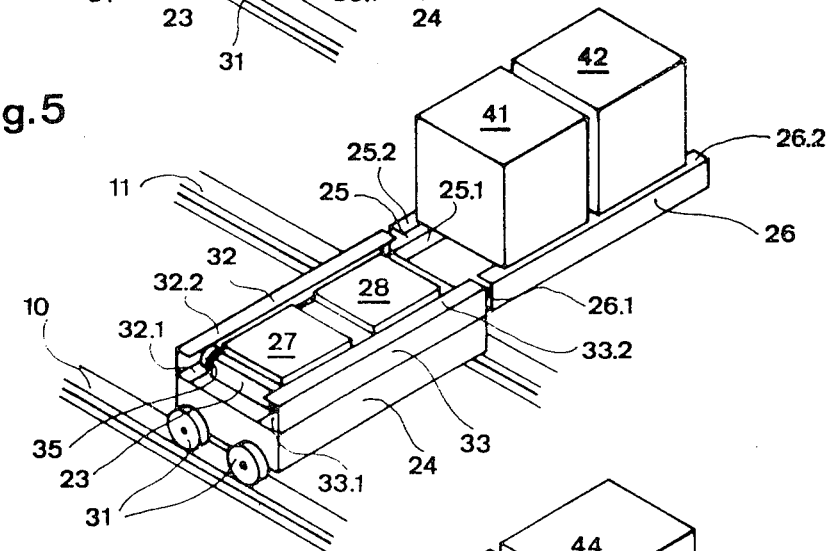
FIG. 5 is a perspective view schematically showing a storehouse room with two short containers, as well as a horizontal transporting unit.
Figure 6:
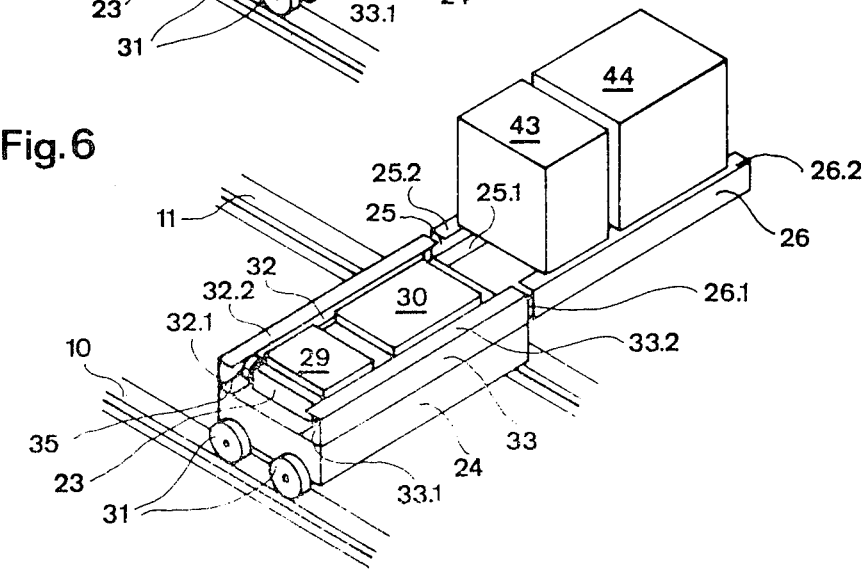
FIG. 6 is a perspective view schematically showing a storehouse room with containers of different length, as well as a horizontal transporting unit.
Figure 7:
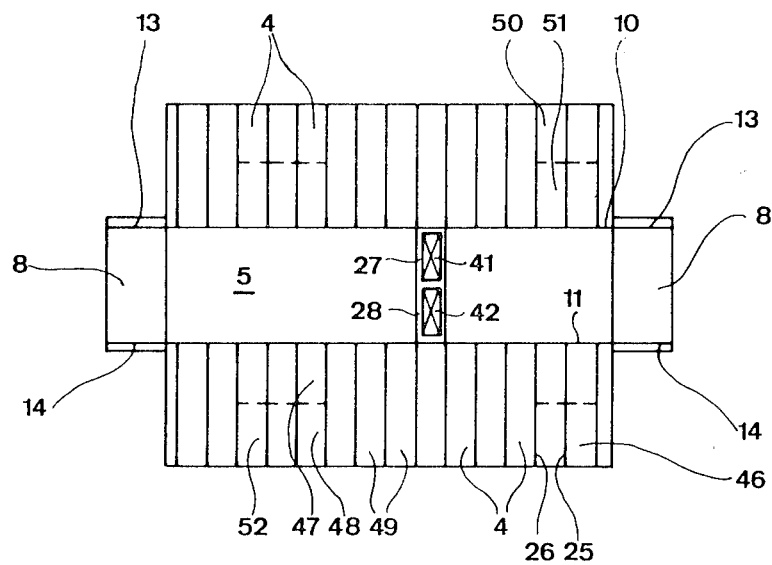
FIG. 7 is a plan view of a floor to show the storage and withdrawal from storehouse of two short containers respectively in or from two storehouse rooms.

The typical operation course during storing will be shown for the case in which, as shown in FIGS. 5 and 7, two short containers 41, 42 have to be placed on the storehouse rooms 46, 47, each container being 20 feet long. The long containers 40, which are 40 feet long, have the same size as the storehouse rooms 4, so that only one storehouse place 49 is available for the same and for each storehouse room. The containers 41, 42 from transport by land by means of truck (lorry) or railway are located by a harbour portal or gantry crane on the transfer station (not shown) and simultaneously registered for the storehouse administration. A horizontal transporting unit comprising a bearing truck 24 and lower truck 23 provides for direct positioning below the containers 41, 42 and lifts the latter by the two translation platforms 27, 28 from the bearing in the transfer station 9.

Thus, the horizontal transporting unit rolls with the containers 41 and 42 to the hoist or elevator platform 12, where the rollers 31 are accomodated by the sliding rails 13, 14. After stop of the hoist or elevator 8 at the preselected floor 3, the sliding rails 13, 14 of the hoist or elevator platform 12 are aligned with the sliding rails 10, 11 in the respective longitudinal lanes 5, whereupon the horizontal transporting unit with the containers 41, 42 leave the hoist or elevator 8 and release the latter for vertical displacement of further horizontal transport units.

Now, the independently operated bearing truck 24 automatically rolls with the lower truck 23 carried thereby and with the two containers 41 and 42 respectively on the translation platforms 27 and 28, moving to in front of the storehouse room 4 intended for the storehouse management, where the container 42 will have to be laid on the storehouse place 46. After alignment of the sliding rails 33, 32 of the bearing truck with the sliding rails 25, 26 of the reached storehouse room, the lower truck 23 enters the storehouse room 4, so that through lowering of the translation platform 28 the container 42 lies on the storehouse place 42. Particularly, the platform 27 with the container 41 remains at lifted position, so that the lower truck 23 with the container 41 lifted and platform 28 lowered, can move from the storehouse room 4 back onto the bearing truck 24, from which the storehouse room with the storehouse places 47 and 48 is reached, as above mentioned. Now, the container 41 will be disposed on the storehouse place 47, as it is assumed that the storehouse place 48 is already occupied.

To this end, the already occupied storehouse place 48 is entered from below by the free lowered translation platform 28 and due to the subsequent lowering of the translation platform 27, the container 41 is located on the storehouse place 47. The lower truck 23 then moves with lowered translation platforms 27, 28 moving back onto the bearing truck 24, where the horizontal transporting unit, at this point completed again, is awaiting the succesive transport order or command from the control system. It is thus evident that the direct storage of the short containers 41 and 42, which have been together transported on the lower truck 23, on the storehouse places 46 and 47 is now possible as a result of the division according to the invention of the means for receiving the loads in the two translation platforms 27 and 28.

As an example of a transfer operation, assume according to FIGS. 5 and 7 that two short containers 41 and 42 on the storehouse places 51 and 52 have to be together transfered to the two sides of the longitudinal lane 5. After positioning in known manner of the horizontal transporting unit in front of the storehouse room 4 containing the storehouse place 52, according to the invention the lower truck 23 moves from the bearing truck 24 to the storehouse room 4 to pass below the short container on the storehouse place 52 with the lowered translation platform 28. Then, the translation platform 28 on the lower truck 23 lifts the container from the support, then the whole means back onto the bearing truck 24 awaiting in the longitudinal lane 5. Then, the storehouse room of the storehouse place 51 is reached, where likewise the corresponding container is received by the translation platform 27. After the lower truck 23 and the short container carried thereby with the bearing truck 24 are joined again to form a horizontal transporting unit, it moves by an assigned vertical hoist or elevator 8 to the transfer station, whereby the withdrawal operation from the storehouse is terminated.

From this functional course, the fact is found that as a result according to the invention of equipping the lower truck 23 with two independent translation platforms 27 and 28, the storehouse can unload short containers 41 and 42 from storehouse rooms 4 at the two sides of the longitudinal lane 5 by a single pass and the least number as possible of storage movements. On the other hand, this would require an inner transfer with the additional expense resulting therefrom and relating to the storage movement and time as well.

Figure 8:
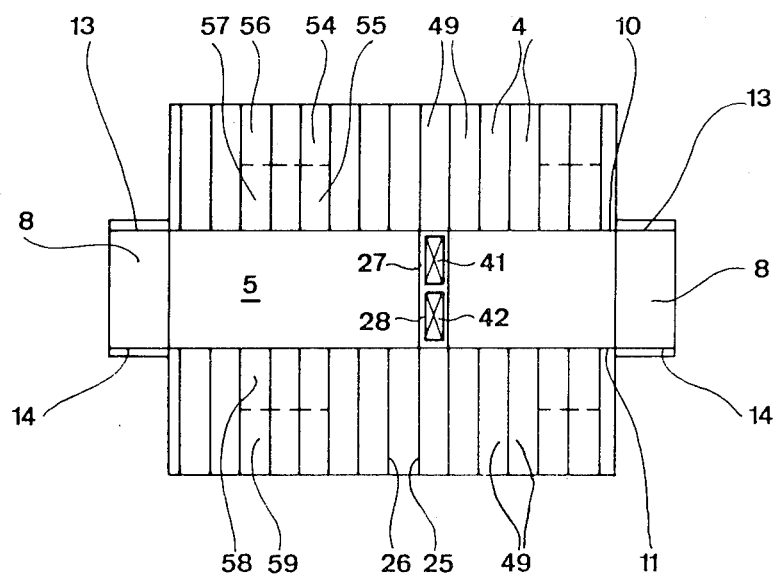
FIG. 8 is a plan view of a floor to show the inner passage of the units.

By way of example, such inner transfers are required when desiring to unload short containers from the storehouse, which containers are on storehouse places, to which a direct access from the longitudinal lanes 5 is impossible. This is concerned, for example as shown in FIG. 8, with the storehouse places 54 and 56, that do not have any access due to short containers located on the storehouse places 55 and 57.

To arrive at short containers on the storehouse places 54 and 56, the storehouse places 55 and 57 have to be cleared before hand. To this end, the containers on the storehouse places 54 and 55 are received by the translation platforms 27 and 28 of a horizontal transporting unit which successively is positioned in front of the storehouse room containing the free or cleared storehouse places 58 and 59. Then, the lower truck 23 moves on the sliding rails 25 and 26 to into this storehouse room to lay the container from the storehouse place 55 on the storehouse place 59 and during the return on the bearing truck 24 to change the container of the storehouse place 54 from the translation platform 27 onto the translation platform 28. Likewise but subsequently, the container on the storehouse place 57 is cleared and then the container on the storehouse place 56 is received by the translation platform 27. The containers of the storehouse places 54 and 56 are now on the translation platforms 27 and 28 of the lower truck 23 and can be transferred in well known manner.

This example shows that short containers, which in connection with a best space exploitation as possible are partly stored without direct access, can be made directly accessible by inner transfer. Such transfers can be easily and readily carried out through the aid of the two independent translation platforms 27 and 28, so that the latter in the form of integrating component can be included in the transfer operation. For requirements of normal storehouse operation, this would correspond to the required direct access to the involved storehouse places.

Of course, in order to assure the direct access, the required transfers can be also carried out accurately from the storehouse manager in periods of reduced traffic.

What we claim is:

1. A conveyor device for a storage plant having at least two floors, each said floor having at least one longitudinal lane and a plurality of storage rooms on both sides of each said lane and extending in a transverse direction from each said lane, said conveyor device comprising:

at least one set of bearing truck rails extending along each said longitudinal lane;

a bearing truck movable along each said set of bearing truck rails;

at least one vertical hoist associated with each said longitudinal lane for receiving and vertically transporting said bearing trucks;

a set of lower truck rails extending from said longitudinal lane into each of said rooms in said transverse direction;

a set of lower truck rails extending in said vertical direction and mounted on each said bearing truck;

a lower truck movable in said transverse direction between said bearing truck and said storage rooms;

at least two independently vertically movable translation platforms mounted on each said lower truck, said platforms being mutually spaced in said transverse direction, whereby containers in said storage rooms can be individually moved.

* * * * *